June 6, 1933.  N. J. CEKORICH  1,913,263
JAR TONGS OR HOOK
Filed Oct. 27, 1932

Inventor
N. J. Cekorich,
By L. F. Randolph, Jr.
Attorney

Patented June 6, 1933

1,913,263

UNITED STATES PATENT OFFICE

NICK J. CEKORICH, OF COKEBURG, PENNSYLVANIA

JAR TONGS OR HOOK

Application filed October 27, 1932. Serial No. 639,883.

The invention relates to devices used for lifting and carrying jars and the like, and has for its object the provision of an improved construction of tongs for the purpose stated and including means for pivotally and slidably adjusting the jaws of the tongs to fit jars and other containers of varying size.

A further object of the invention is the provision of jar tongs or hooks that are reasonable in cost of manufacture, that are extremely effective in operation, and simple in manipulation.

Figure 1:
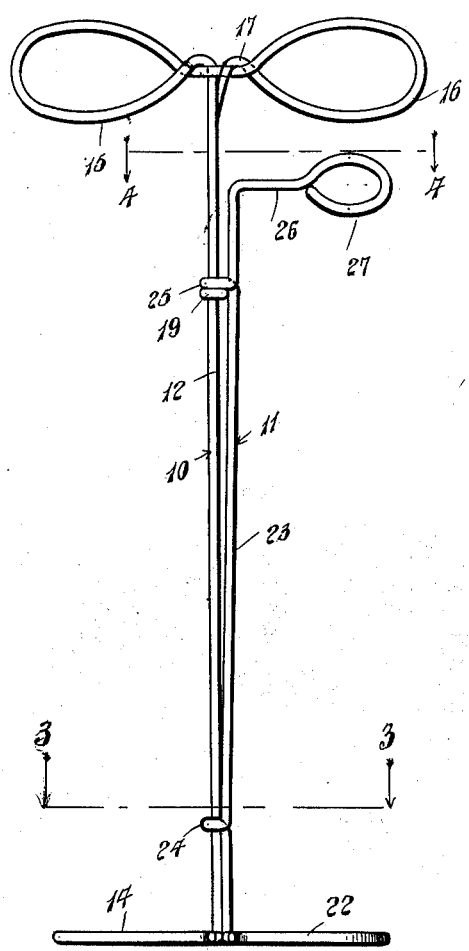
Figure 2:
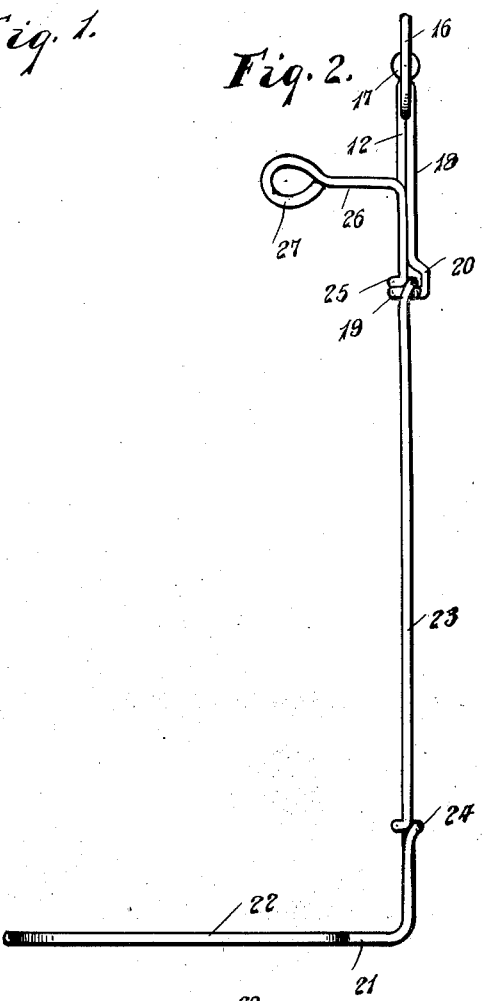
Figure 3:
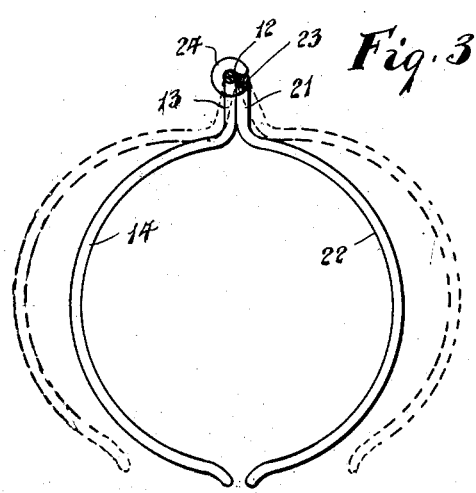
Figure 4:
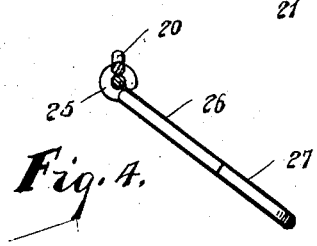

The invention will be described in detail hereinafter and will be found illustrated in the accompanying drawing, in which Figure 1 is a front view in elevation of the improved jar tongs or hooks, Figure 2 is a side view, Figure 3 is a transverse sectional vew on a plane indicated by the line 3—3 of Figure 1, and Figure 4 is a similar view on a plan indicated by the line 4—4 of Figure 1.

In the drawing similar reference characters are used to designate corresponding parts in all the views.

As shown in the drawing the jar tongs or hooks are made of two relatively pivoted and slidable members, designated 10 and 11, respectively, said members being preferably made of a suitable gauge of wire stock.

Member 10 has a stem 12 with one of its ends bent at substantially a right angle as shown at 13 and its extremity provided with an arcuate portion 14, forming one of the jaws for engaging the neck of a jar or other container. At the opposite end of the stem the wire is bent to form oppositely disposed loops 15 and 16, and the wire bent as shown at 17 and extended downwardly as shown at 18 and secured by means of a loop 19 to the stem 12 remote from the looped portions 15 and 16, said looped portions forming a handhold in operating the tongs or hooks. Adjacent to the loop 19 the portion of the wire 18 extends outwardly to form an offset 20 for the purpose to be hereinafter more fully disclosed.

The wire forming the other member 11 is also provided with a substantially right angular offset portion 21 and has its extremity provided with an arcuate portion 22 that is oppositely disposed to the arcuate portion 14, hereinbefore described, and the two arcuate portions 14 and 22, coact to provide the grappling jaws of the tongs or hooks. A stem 23 of the portion 11 is provided with spaced angularly disposed loops 24 and 25 receiving the stem 12. The loop 25 is mounted on that part of the stem 12 above the loop 19 so that the loop 25 is arranged within the recess 20. By this construction the stem 23 is pivotally and slidably mounted relatively to the stem 12, but the slidable movement of the stem 23 is limited by the loop 25 engaging in the recess 20. The upper end of the stem 23 has an angular extension 26, provided with a terminal loop 27, said angular extension and loop being provided to manipulate the stem 23 in its pivotal and sliding movement.

In use the loops 15 and 16 are grasped by the hand of the operator and the arcuate jaw 22 is moved away from the jaw 14 by pressure against the loop 27 by the thumb or finger of the hand of the operator, and then manipulated in the opposite direction to grasp the jar neck or other receptacle. It will be understood that the device is adaptable to use with jars and other receptacles of varying sizes, and that should the receptacle to be handled be smaller than could be conveniently engaged by pivotal movement of the jaws, the stem 23 may be moved upwardly by sliding it on the stem 12 and permit the jaws to overlie one another for engagement with a smaller receptacle, the sliding movement of the stem 23 being limited, as hereinbefore stated, by engagement of the loop 25 in the recess 20.

What is claimed is:—

1. Jar lifting tongs, comprising a stem, a second stem having spaced loops thereon receiving the first stem and pivotally and slidably mounting it thereon, each of said stems having a grappling jaw thereon adapted to coact to engage a jar, and means on the first stem engaging a loop on the second stem to limit the sliding movement thereof.

2. Jar lifting tongs, comprising a stem made of a single strand of wire having an arcuate jaw provided on one of its ends, the other end of said wire bent to provide a handhold and its extremity returned along the stem and secured thereto, the returned portion having an offset recess therein adjacent to the secured portion thereof, a second stem made of a single strand of wire having an arcuate jaw provided on one of its ends to coact with the first mentioned jaw, the other end of said wire angularly disposed to the stem providing a crank, and the stem intermediate of its ends provided with angularly disposed spaced loops receiving the first stem and pivotally and slidably mounting the second stem on the first stem, one of said loops being located in said recess to limit sliding movement of said second stem.

In testimony whereof I affix my signature.

NICK J. CEKORICH.